United States Patent [19]

Moret

[11] 4,388,937

[45] Jun. 21, 1983

[54] MACHINE FOR THE CHEMICAL FROSTING OF GLASS ARTICLES

[76] Inventor: Claude M. Moret, 51 rue Pasteur, 77120 Pommeuse, France

[21] Appl. No.: 298,776

[22] Filed: Sep. 2, 1981

[51] Int. Cl.³ .............................................. B08B 3/02
[52] U.S. Cl. ..................................... 134/73; 134/184
[58] Field of Search .................. 134/72, 73, 131, 151, 134/184

[56] References Cited

U.S. PATENT DOCUMENTS

| | | | |
|---|---|---|---|
| 2,036,647 | 4/1936 | Achauer | 134/131 |
| 2,166,428 | 7/1939 | Du Bois | 134/72 X |
| 3,002,731 | 10/1961 | Gelfand et al. | 134/73 X |
| 4,057,070 | 11/1977 | van Amerongen et al. | 134/184 X |

FOREIGN PATENT DOCUMENTS 622536 1/1963 Belgium .
1254077 11/1967 Fed. Rep. of Germany .
705735 6/1931 France .
2332820 6/1977 France ................................. 134/72
1196858 7/1970 United Kingdom .

*Primary Examiner*—Robert L. Bleutge
*Attorney, Agent, or Firm*—Eyre, Mann, Lucas & Just

[57] ABSTRACT

A machine for chemically frosting articles made of glass, more particularly flasks, of the type comprising a continuous conveyor-chain passing consecutive treatment stations, from frosting to drying, and furthermore comprising holders in the form of sealing stoppers for the flasks; the conveyor-chain is made of a material resistant to the reactants used, is equipped with hooking means co-operating with holders for the articles to be frosted, and is in the form of links hinged in pairs about an axis; the axis is extended outwardly on at least one side of the chain to act as a hooking means for the holders of the articles.

6 Claims, 3 Drawing Figures

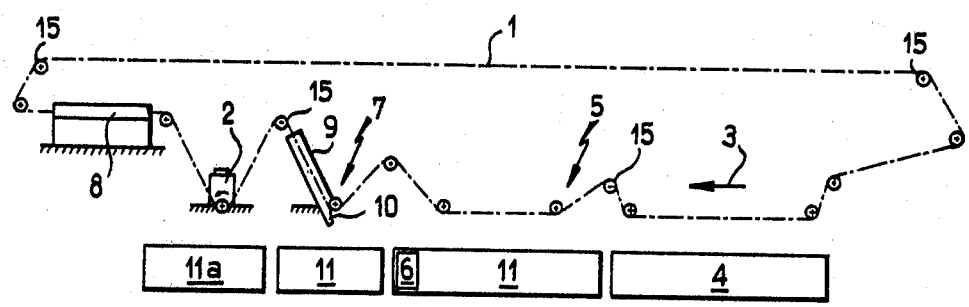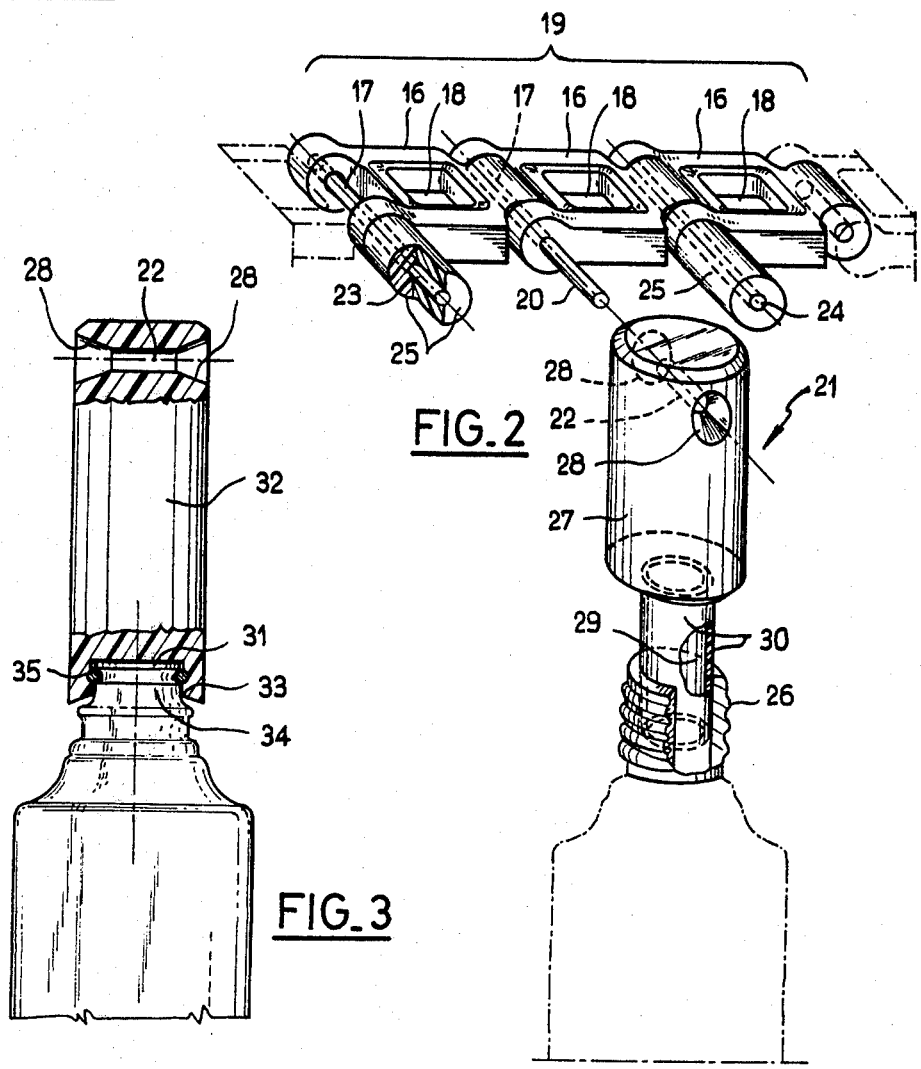

MACHINE FOR THE CHEMICAL FROSTING OF GLASS ARTICLES

The present invention relates to a machine, and to certain components thereof, designed for chemically frosting articles made of glass, more particularly flasks.

Flasks of frosted glass are known to be widely used in industry, in the laboratory and in the fields of perfumery and pharmacy.

In spite of the increasing demand for such articles, however, they are still produced on a handicraft scale essentially involving manual labour. Such production methods result, on the one hand, in low productivity and, on the other hand, in particularly arduous working conditions, quite apart from the constant danger to which operators are exposed by reason of the high toxicity of the chemical reactants used.

Thus, at the present time, frosting is carried out by closing the flask with a rubber stopper or "cape" serving as a sort of collar, arranging the flasks thus stoppered in perforated baskets, immersing the baskets in the reactant, washing them under a water-spray, carrying out chemical neutralization, re-washing, and drying. All of these operations are manual, the operators being protected with goggles, gloves, aprons and, if possible, with breathing filters.

It is an object of the present invention to overcome these disadvantages by providing a fully automatic machine equipped with remote-control, to permit simple, regular and safe production of chemically frosted articles made of glass.

The machine according to the invention is of the type comprising a continuous conveyor-chain which passes the treatment stations, the chain being made of a material resistant to the reactants used and being equipped with hooking means co-operating with holders for the articles to be frosted, the holders also constituting sealed stoppers.

According to other advantageous characteristics:

the chain consists of links hinged in pairs around an axis, the axis being extended outwardly at least on one side of the chain and forming a hooking means for the holders of the articles;

a flask holder is in the form of a sealing adapter secured to the neck of a bottle and comprising an aperture into which an extended axis of the chain may be inserted;

a hooking unit is distributed over three consecutive links of the chain, the three axes of which are extended, the central axis being designed to cooperate with a holding stopper, and the two adjacent extended axes each being fitted with a sleeve acting as a stop restricting angular displacement of the holding stopper about the central axis.

Other characteristics and advantages of the invention are explained in greater detail in the following description in conjunction with the drawings attached hereto, wherein:

FIG. 1 is a synoptical diagram illustrating the operation of a machine according to the invention;

FIG. 2 is a diagrammatical perspective view, in part section, of a hooking unit co-operating with a flask-holding stopper secured inside the neck;

FIG. 3 is a diagrammatical representation, in part section, of a flask-holding stopper having a securing ring.

In these drawings, the same elements bear the same reference numerals.

With reference to FIG. 1, the machine according to the invention comprises a suitable structure (not shown) upon which a conveyor-chain 1 travels, the chain being driven by a variable-speed reducing motor of any suitable type, thus allowing the treatment period at each station to be set. The chain moves in the direction of arrow 3, for example, past successive treatment-stations, to wit: a frosting bath 4, an ultrasonic washing station 5, a neutralizing station 6, a rinsing station 7 and a drying station 8.

The frosting bath contains a solution of an appropriate reactant, for example that available commercially under the name "LERITE SX 13". The tank containing this bath may be equipped with the usual heating and cooling elements.

Rinsing station 7 comprises a sloping tube 9 equipped with pressurized water-injection nozzle (not shown). The chain, and the articles hooked thereto, enter tube 9 through the opening in the bottom thereof, the tube itself forming a spout for the escape of rinsing water into a collecting tank 11. An additional collecting tank 11a may be arranged in the vicinity of the outlet from rinsing station 7.

Neutralizing station 6 consists of a tank containing a bath suitable for a frosting reactant, for example an aqueous solution of hydrochloric acid in the case of LERITE SX 13.

Drying station 8 consists of a tunnel preferably equipped with infrared elements.

It is to be understood that the machine described hereinbefore may be completed with a preliminary degreasing station 12, a station for hooking-up articles 13, and an unhooking station 14 at the outlet from tunnel 8 in the direction of arrow 3. The conveyor-chain is continuous and runs over suitable pulleys or sprockets 15.

With reference to FIG. 2, the conveyor chain consists of links 16 which pivot about axes 17. As indicated above, the links are made of a material resistant to the reactants used, for example a plastic of the polycarbonate type, the actual axes being made of stainless steel. Each link comprises a central recess 18 adapted to accommodate the tooth of a driving or return sprocket.

A hooking unit according to the invention, generally marked 9, is distributed over three consecutive links, the hinge axes of these links being extended at least from one side of the chain. Extended axis 20 of the central link constitutes the means for hooking a holder, generally marked 21, through an aperture 22 therein, as described in greater detail hereinafter. Extended axes 23,24 of the two adjacent links carry sleeves 25 made of a suitable plastic material, for example of the polyamide type.

A holder 21 for flasks having threaded necks both secures and seals the flasks, since it is generally undesirable to frost the inside of a flask for the applications mentioned hereinbefore. A holder of this kind comprises, on the one hand, a cylindrical element 27, the upper part of which is provided with an orifice or passage 22, the axis of which runs at right angles to the longitudinal axis of the holder, and which accommodates extended axis 20 of the conveyor-chain. It is desirable for the ends of the passage to be flared at 28 to facilitate insertion of the axis.

The lower end of element 27, remote from the passage, comprises a conical mandrel 29, integral therewith and carrying a resilient sleeve 30. It is desirable for the element and mandrel to be made of a rigid material such as polyamide, whereas the sleeve is resilient in order to secure and seal neck 26 of the flask, and is therefore made of polyvinyl-chloride.

According to another embodiment illustrated in FIG. 3, a flask-holder having an annular securing ring 31 comprises a cylindrical body 32 again provided with a passage 22 with flared ends 28 designed to co-operate with an extended axis 20. The end of the body remote from passage 22 has a cylindrical bore 33 of a diameter sufficient to admit neck 34 of the flask and comprising an annular groove in which is arranged a toroidal gasket 35 adapted to engage sealingly under ring 31.

When a holder is engaged by a hooking axis 20 (FIG. 2), the angular movement thereof is limited by adjacent sleeves 25 which act as stops. The reason for this is that when flasks which are sealed but empty pass through the baths provided, they tend to float and assume a horizontal attitude. The stops allow them to be immersed correctly in the baths, limiting them to an oblique attitude.

It is also of advantage, in order to add to the automatic nature of the machine, for the hooking-up and unhooking stations 13 and 14 (FIG. 1) to be associated with stations at which the flasks are stoppered and unstoppered, more particularly by means of jacks.

It is to be understood that the present invention has been described and illustrated hereinbefore merely by way of example which is in no way restrictive, and that any modification in the form of technical equivalents may be applied thereto, without departing from the scope thereof.

What is claimed is:

1. A machine for chemically frosting articles made of glass, more particularly flasks, said machine being of the type comprising a continuous conveyor-chain passing consecutive treatment stations, from frosting to drying, and furthermore comprising holders in the form of sealing stoppers for said flasks, characterized in that the conveyor-chain is made of a material resistant to the reactants used, is equipped with hooking means co-operating with holders for the articles to be frosted, and is in the form of links hinged in pairs about an axis, said axis being extended outwardly on at least one side of the chain to act as a hooking means for the holders of the articles.

2. A machine according to claim 1, characterized in that a flask holder consists of a sealing stopper secured to the neck of a flask and comprising a passage into which an extended axis of the conveyor-chain may be inserted.

3. A machine according to claim 1, characterized in that a hooking unit is distributed over three consecutive links of the chain, the three hinge-axes being extended and the central axis being designed to co-operate with a holding stopper, the two adjacent extended axes being equipped with sleeves designed to act as stops limiting the angular motion of the holding stoppers about said central axis.

4. A machine according to claim 3, characterized in that the hooking units are arranged at intervals along the conveyor-chain, in such a manner that the distance between said hooking units covers several links of said chain.

5. A machine according to claim 1, characterized in that it comprises a frosting-agent-neutralizing station located between an ultrasound washing station and a rinsing station.

6. A machine according to claim 5, characterized in that the rinsing station comprises a sloping tube equipped with pressurized-water-injection nozzles, the inlet being located at the lower end of said tube and being equipped with an outlet spout for the rinsing water facing a collecting tank; said collecting tank being equipped with pressurized-water-injection nozzles having an inlet located at the lower end of said tube and an outlet spout for the rinsing water facing a collecting tank.

* * * * *